United States Patent
Sakamoto et al.

(10) Patent No.: US 10,145,334 B2
(45) Date of Patent: Dec. 4, 2018

(54) CONTAINER-TYPE COMPRESSED AIR STORAGE POWER GENERATION DEVICE

(71) Applicant: Kobe Steel, Ltd., Hyogo (JP)

(72) Inventors: Kanami Sakamoto, Takasago (JP); Hiroki Saruta, Takasago (JP); Masaki Matsukuma, Hyogo (JP); Masatake Toshima, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/508,301

(22) PCT Filed: Sep. 18, 2015

(86) PCT No.: PCT/JP2015/076771
§ 371 (c)(1),
(2) Date: Mar. 2, 2017

(87) PCT Pub. No.: WO2016/047630
PCT Pub. Date: Mar. 31, 2016

(65) Prior Publication Data
US 2017/0284336 A1    Oct. 5, 2017

(30) Foreign Application Priority Data

Sep. 25, 2014  (JP) ................. 2014-195842
Jan. 6, 2015   (JP) ................. 2015-001043

(51) Int. Cl.
*F02C 6/16*    (2006.01)
*F02G 1/055*   (2006.01)
(Continued)

(52) U.S. Cl.
CPC ............ *F02G 1/055* (2013.01); *F02C 6/16* (2013.01); *F02G 1/045* (2013.01); *F17C 1/00* (2013.01);
(Continued)

(58) Field of Classification Search
CPC ............ F02C 6/16; F02G 1/055; Y02E 60/15
See application file for complete search history.

(56) References Cited

U.S. PATENT DOCUMENTS 4,242,878 A * 1/1981 Brinkerhoff ........ F04B 39/0005
                                                    123/41.2
4,849,648 A * 7/1989 Longardner .............. F02C 6/16
                                                      290/54
(Continued)

FOREIGN PATENT DOCUMENTS

JP    2013-512410 A    4/2013
JP    2014-522938 A    9/2014
(Continued)

OTHER PUBLICATIONS

International Search Report issued in PCT/JP2015/076771; dated Dec. 15, 2015.
(Continued)

*Primary Examiner* — Jonathan Matthias
(74) *Attorney, Agent, or Firm* — Studebaker & Brackett PC

(57) ABSTRACT

A container-type compressed air storage power generation device (2) comprises compressors (5a-5c); a tank (8); power generators (9a-9c); a control device (12); and a container (4). The compressors (5a-5c) compress air. The tank (8) is driven by air supplied from the compressors (5a-5c). The power generators (9a-9c) are driven by air supplied from the tank (8). The control device drives and controls the compressors (5a-5c) and the power generators (9a-9c). The container (4) houses the compressors (5a-5c) and the power generators (9a-9c), and the tank (8) is disposed outside the container (4). Therefore, the container-type compressed air storage power generation device (2) is easy to transport and construct on-site.

10 Claims, 10 Drawing Sheets

(51) Int. Cl.
    *F02G 1/045*     (2006.01)
    *F17C 1/00*     (2006.01)

(52) U.S. Cl.
    CPC .... *F02G 2280/50* (2013.01); *F17C 2221/031* (2013.01); *F17C 2227/0157* (2013.01); *F17C 2227/0311* (2013.01); *F17C 2250/03* (2013.01); *F17C 2270/0581* (2013.01); *Y02E 60/15* (2013.01)

(56) References Cited

U.S. PATENT DOCUMENTS

| | | |
|---|---|---|
| 2006/0262465 A1 | 11/2006 | Wiederhold |
| 2011/0127004 A1 | 6/2011 | Freund et al. |
| 2015/0176526 A1 | 6/2015 | Frazier et al. |

FOREIGN PATENT DOCUMENTS

| | | |
|---|---|---|
| WO | 2013/003654 A2 | 1/2013 |
| WO | 2013/119327 A1 | 8/2013 |

OTHER PUBLICATIONS

The extended European search report issued by the European Patent Office dated Apr. 17, 2018, which corresponds to European Patent Application No. 15843216.1-1007 and is related to U.S. Appl No. 15/508,301.

* cited by examiner

CONTAINER-TYPE COMPRESSED AIR STORAGE POWER GENERATION DEVICE

TECHNICAL FIELD

The present invention relates to a compressed air energy storage power generation device.

BACKGROUND ART

A compressed air energy storage (CAES) power generation device stores electric energy as a form of compressed air during off-peak hours of a power generation plant and operates a power generator by using the stored compressed air during times of high power demand, thereby generating electric energy.

A typical CAES power generation device releases compression heat during storage of the compressed air, resulting in energy loss. A power generation device configured to prevent such energy loss to improve system efficiency is an adiabatic compressed air energy storage (ACAES) power generation device. The ACAES power generation device recovers and stores compressed air to prevent compression heat from being released during storage of the compressed air, and the stored heat is returned to the compressed air for driving an expander. Thus, system efficiency is improved.

The ACAES power generation device configured as above is disclosed, for example in, Patent Document 1.

An ACAES power generation device configured to store compression heat in a thermal energy storage (TES) system is disclosed in Patent Document 1.

A compressor, a power generator, a tank, or the like of a known CAES power generation device including the power generation device disclosed in Patent Document 1 are all assembled on site; therefore, the transportation of the CAES power generation device is complicated and the construction thereof requires time and cost.

CITATION LIST

Patent Document

Patent Document 1: JP 2013-512410 A

SUMMARY OF THE INVENTION

An object of the present invention is to provide a CAES power generation device that facilitates the transportation and on-site construction thereof.

The present invention provides a container-type compressed air energy storage power generation device including: a compressor for compressing air; a tank for storing the air compressed by the compressor; a power generator to be operated by the air supplied from the tank; a control device for controlling operation of the compressor and the power generator; and a container, wherein at least one of the compressor and the power generator is housed in the container, wherein the tank is arranged outside the container. Alternatively, the container-type compressed air energy storage power generation device may be configured so that both the compressor and the power generator are housed in the container.

According to the container-type compressed air energy storage power generation device, units required for the CAES power generation device are housed in the container; thereby, the transportation and on-site construction of the CAES power generation device can be facilitated. Further, the compressed air storage tank, the required capacity of which may vary depending on the power-generating time, is separately provided outside the container. Therefore, design changes of portions of the power generation device depending on whether the required power-generating time is short or long are not necessary, and the same package is usable, which is cost effective.

The container of the container-type compressed air energy storage power generation device may include a first container housing the compressor and a second container housing the power generator. Further, a first heat exchanger may be housed in the first container and a second heat exchanger may be housed in the second container.

According to the container-type compressed air energy storage power generation device, the container is divided into a portion having the compression function and a portion having the power generation function; thereby, the container can be downsized. Such downsizing allows the power generation device to be more easily transported, and the design flexibility of the layout for arranging the container can be expanded.

The container-type compressed air energy storage power generation device may further include: a first heat exchanger for transferring heat between the air, compressed and heated in the compressor to be supplied into the tank, and a heat storage fluid and for heating the heat storage fluid; a second heat exchanger for transferring heat between the air, supplied from the tank to the power generator, and the heat storage fluid and heating the air; and a heat storage section for storing the heat storage fluid, the heat storage section being fluidly connected to the first heat exchanger and the second heat exchanger, wherein the first heat exchanger may be housed in the container housing the compressor and the second heat exchanger may be housed in the container housing the power generator, and wherein the heat storage section may be arranged outside the container housing the compressor and outside the container housing the power generator.

According to the container-type compressed air energy storage power generation device, units required for an adiabatic compressed air energy storage (ACAES) power generation device are housed in the container; thereby, the transportation and on-site construction of the ACAES power generation device can be facilitated. Further, the heat storage section, the required capacity of which may vary depending on the power-generating time, is separately provided outside the container. Therefore, design changes of portions of the power generation device depending on whether the required power-generating time is short or long are not necessary, and the same package is usable, which is cost effective.

The heat storage section of the container-type compressed air energy storage power generation device may include: a first heat storage tank for storing the heat storage fluid heated to high temperature in the first heat exchanger, the first heat storage tank being fluidly connected to the second heat exchanger so that the heated heat storage fluid is supplied to the second heat exchanger; and a second heat storage tank for storing the heat storage fluid cooled by heat recovery in the second heat exchanger, the second heat storage tank being fluidly connected to the first heat exchanger so that the cooled heat storage fluid is supplied to the first heat exchanger.

According to the container-type compressed air energy storage power generation device, two heat storage tanks of the first heat storage tank and the second heat storage tank are provided; thereby, the heat storage fluid can be stored at different temperatures. As a result, the heat exchanger effectiveness in the first heat exchanger and the second heat exchanger can be increased.

The container-type compressed air energy storage power generation device may further include a heat storage container housing the heat storage section.

The container-type compressed air energy storage power generation device further includes the heat storage container housing the heat storage section; therefore, heat loss due to heat radiation can be prevent, and the transportation and on-site construction of the container-type compressed air energy storage power generation device can be facilitated.

The container-type compressed air energy storage power generation device may further include a heat storage container housing the heat storage section, the heat storage container being internally provided with a partition to separately house the first heat storage tank and the second heat storage tank.

According to the container-type compressed air energy storage power generation device, the heat storage container is internally provided with the partition; thereby, the first heat storage tank and the second heat storage tank can be separately housed. Therefore, heat loss due to heat radiation can be prevented.

The container-type compressed air energy storage power generation device may further include a heat storage container housing the heat storage section, the heat storage container including a third container storing the first heat storage tank and a fourth container storing the second heat storage tank.

According to the container-type compressed air energy storage power generation device, the heat storage container includes the third container and the fourth container; thereby, the first heat storage tank and the second heat storage tank can be separately housed and heat loss due to heat radiation can be prevented.

The heat storage container, housing the heat storage section, of the container-type compressed air energy storage power generation device may be an insulated container internally provided with a heat insulating material.

According to the container-type compressed air energy storage power generation device, the heat storage container is internally provided with the heat insulating material; thereby, heat loss due to heat radiation can be prevented.

The container-type compressed air energy storage power generation device may be configured such that the first heat exchanger is arranged at the lower side of the compressor so as to overlap the compressor and such that the second heat exchanger is arranged at the lower side of the power generator so as to overlap the power generator.

According to the container-type compressed air energy storage power generation device, a limited space in the container can be effectively used and therefore the size of the container may be prevented from being increased. In addition, the first and second heat exchangers are arranged so as that the compressor and the power generator overlap the first and second heat exchangers, respectively; thereby, pneumatic piping (air supply piping) can be reduced, and heat loss due to heat radiation can be prevented.

According to the present invention, at least one of the compressor and the power generator of the CAES power generation device is housed in the container; thereby, the transportation and on-site construction of the CAES power generation device can be facilitated.

DESCRIPTION OF EMBODIMENTS

Figure 1A:
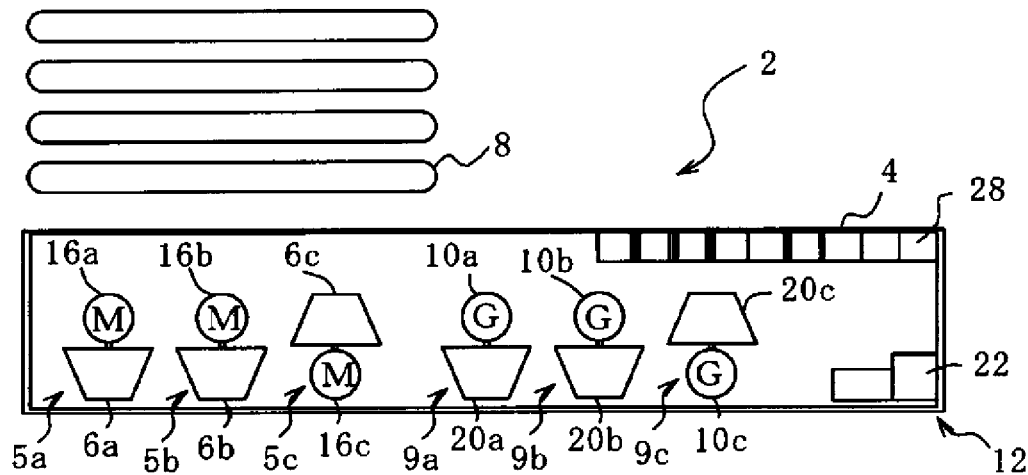
FIG. 1A is a schematic plan view of a container-type CAES power generation device according to a first embodiment of the present invention.
Figure 1B:
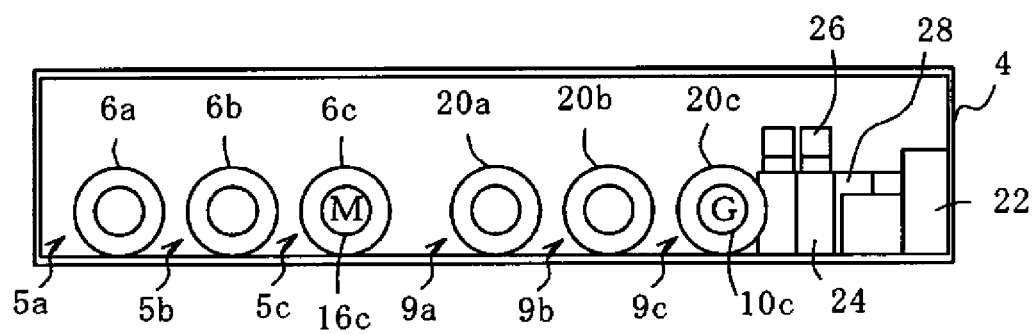
FIG. 1B is a schematic front view of the container-type CAES power generation device according to the first embodiment of the present invention.

Hereinafter, embodiments of the present invention will be described with reference to the accompanying drawings.

[First Embodiment]

A container-type compressed air energy storage (CAES) power generation device 2 according to a first embodiment of the present invention is shown in FIG. 1A to FIG. 1C and FIG. 2. The container-type CAES power generation device 2 is configured so that CAES power generation units are housed in a container 4. The container-type CAES power generation device 2 is used, for example, for smoothing fluctuating power, cutting the peak demand, or storing electricity.

The container-type CAES power generation device 2 of the first embodiment will be described with reference to FIG. 1A to FIG. 1C and FIG. 2.

The container-type CAES power generation device 2 is equipped with the CAES power generation units and the container 4. The CAES power generation units include three compressors 5a to 5c, tanks 8, three power generators 9a to 9c, and a control device 12. In the container-type CAES power generation device 2 of the first embodiment, the compressors 5a to 5c, the power generators 9a to 9c, and the control device 12 are arranged inside the singe container 4, and the tanks 8 are arranged outside the container 4. The compressors 5a to 5c are connected via air supply pipes 14 (see FIG. 2) to the tanks 8, and the power generators 9a to 9c are connected via air supply pipes 14 to the tanks 8. In the first embodiment, the compressors 5a to 5c, the power generators 9a to 9c, and the control device 12 are arranged substantially in a row in the container 4 in the mentioned order from the left in FIG. 1A and FIG. 1B.

The compressors 5a to 5c are provided with compressor bodies 6a to 6c and motors 16a to 16c that are mechanically connected to the compressor bodies 6a to 6c. The motors 16a to 16c are supplied with electric power from an electric power source (not shown) to be driven. When the motors 16a to 16c are driven, the compressor bodies 6a to 6c absorb air surrounding the compressor bodies 6a to 6c to compress the air. The compressors 5a to 5c are connected via the air supply pipes 14 to the tanks 8, and the air compressed in the compressors 5a to 5c is supplied through the air supply pipes 14 to the tanks 8.

Valves 18a to 18c are provided in the respective air supply pipes 14 located between the compressors 5a to 5c and the tanks 8. The valves 18a to 18c are, respectively, provided to the compressors 5a to 5c. The compressed air can be supplied selectively from any of the compressors 5a to 5c to the tanks 8. In addition, the number of compressors 5a to 5c to be used may be controlled by the valves 18a to 18c to regulate the volume of compressed air to be supplied to the tanks 8.

Figure 1C:
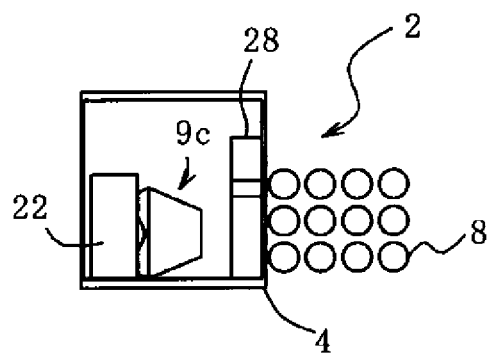
FIG. 1C is a schematic side view of the container-type CAES power generation device according to the first embodiment of the present invention.
Figure 2:
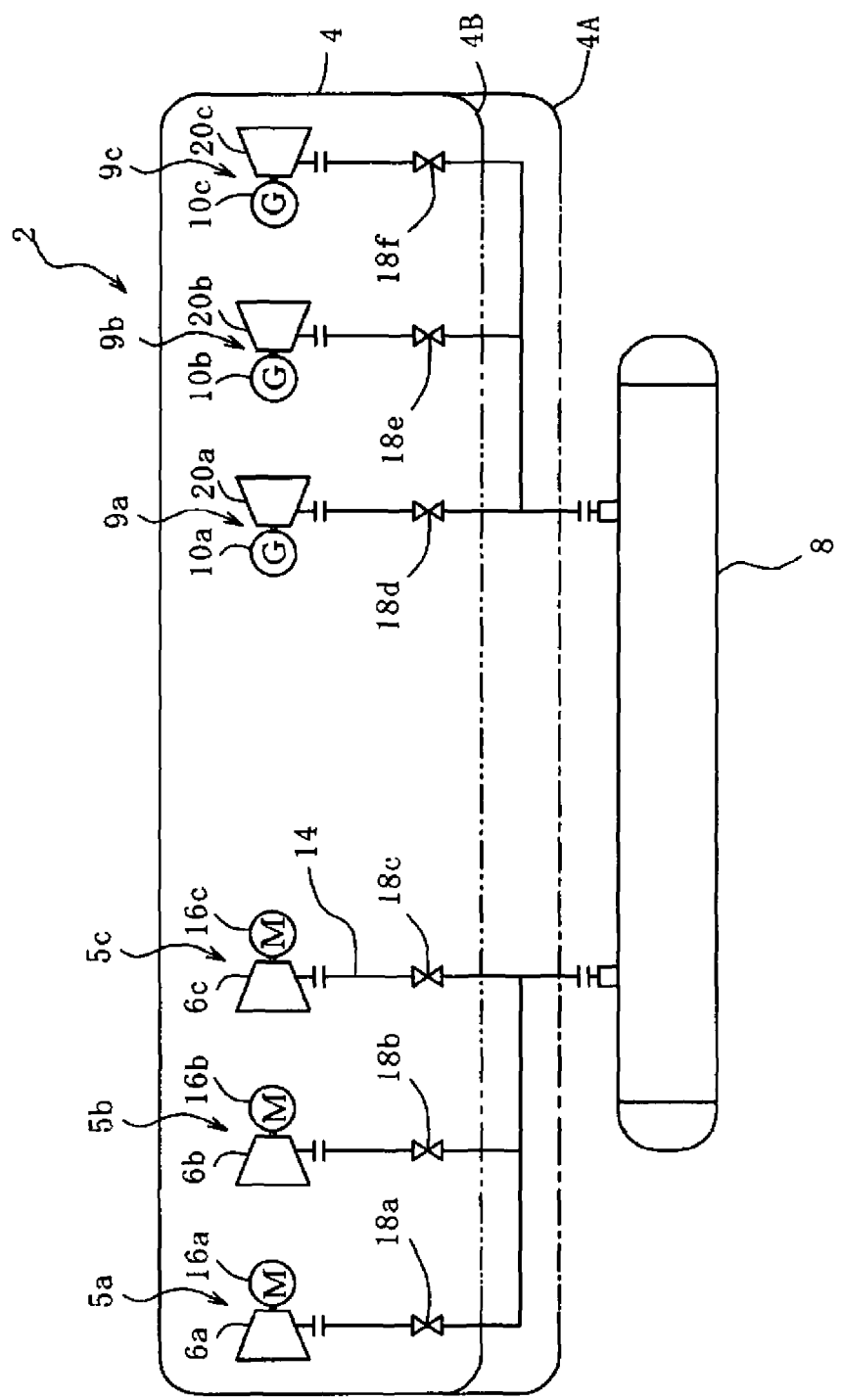
FIG. 2 is a schematic configuration diagram illustrating connection configurations of respective portions in FIG. 1A to FIG. 1C.
Figure 3A:
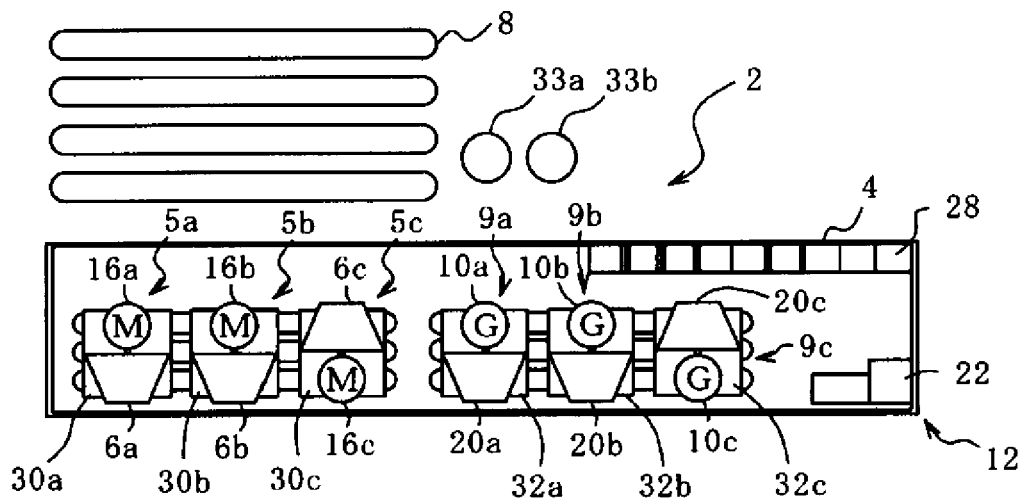
FIG. 3A is a schematic plan view of the container-type CAES power generation device according to a second embodiment of the present invention.
Figure 3B:
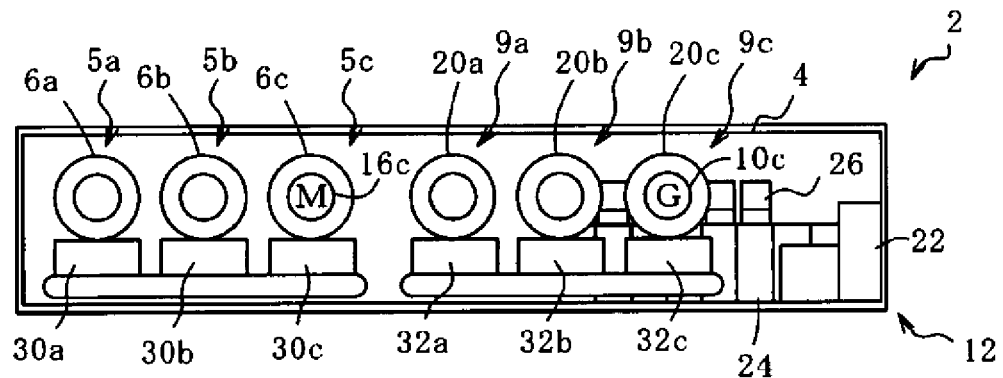
FIG. 3B is a schematic front view of the container-type CAES power generation device according to the second embodiment of the present invention.
Figure 3C:
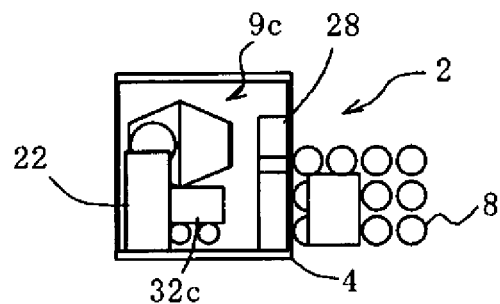
FIG. 3C is a schematic side view of the container-type CAES power generation device according to the second embodiment of the present invention.

The tanks 8 are configured to store the air compressed in the compressors 5a to 5c. The size and number of tanks 8 to be used are as shown in FIG. 1C. Twelve tanks 8 having the same size are provided in the first embodiment. Alternatively, the size and number of tanks 8 can be changed in accordance with, for example, the required electric power and the power-generating time and may be selected as necessary. The tanks 8 are connected to the power generators 9a to 9c via the air supply pipes 14, and the compressed air stored in the tanks 8 is supplied through the air supply pipes 14 to the power generators 9a to 9c.

The power generators 9a to 9c are provided with expanders 20a to 20c that are mechanically connected to power generator bodies 10a to 10c. The expanders 20a to 20c are driven by the compressed air supplied from the tanks 8. When the expanders 20a to 20c are driven, the power generators 9a to 9c individually generate electric power. The power generators 9a to 9c connected to an external system (not shown) can supply the generated electric power to the external system.

Valves 18d to 18f are provided in the respective air supply pipes 14 located between the tanks 8 and the power generators 9a to 9c. In the first embodiment, the valves 18d to 18f are, respectively, provided to the power generators 9a to 9c. Therefore, the compressed air from the tanks 8 can be selectively supplied to any of the power generators 9a to 9c. In this manner, the number of power generators 9a to 9c to be used may be controlled by the valves 18d to 18f to regulate the amount of electric power to be generated.

The arrangement of the air supply pipes 14 inside and outside the container 4 will be described. The compressors 5a to 5c and the power generators 9a to 9c, both of which are housed in the container 4 are connected by the corresponding air supply pipes 14 to the tanks 8 arranged outside the container 4. For example, as indicated by a chain line 4A, if the air supply pipes 14 are merged inside the container 4 to be subsequently extended outward from the container 4, the number of pipes outside the container 4 can be reduced; however, an extra space in the container 4 is reduced. On the other hand, as indicated by a two-dot chain line 4B, if the air supply pipes 14 are extended outward from the container 4 to be subsequently merged outside the container 4, the number of pipes outside the container 4 is increased; however, an extra space in the container 4 can be secured. As a result, the arrangement of the air supply pipes 14 may be changed according to pipe processing of the air supply pipes 14 or according to the necessity of an extra space in the container 4.

The control device 12 includes a control board 22, an inverter 24, a reactor 26, and a converter 28; thereby, respective portions of the container-type CAES power generation device 2 are electrically connectable to one another. The converter 28 may be omitted depending on the output type. The control device 12 is electrically connected to the compressors 5a to 5c, the power generators 9a to 9c, and the valves 18a to 18f to control the operations thereof. For example, the control device 12 is configured to control smoothing of fluctuating power. In the power smoothing control, when fluctuating power from the electric power source (not shown) is greater than a predetermined value, the valves 18a to 18c are opened to drive the compressors 5a to 5c; therefore, electric energy is stored as a form of the compressed air in the tanks 8. Further, when fluctuating power from the electric power source (not shown) is smaller than the predetermined value, the valves 18d to 18f are opened to drive the power generators 9a to 9c by the compressed air from the tanks 8; thereby, the power generators generate electric power. The predetermined value used here may be determined as a value of required electric power on the basis of data of the past electric power demand. As just described, the control device 12 controls the operation of the compressors 5a to 5c, the power generators 9a to 9c, and the valves 18a to 18f, thereby smoothing fluctuating power. The control device 12 may be used not only for smoothing fluctuating power but also for cutting the peak demand as previously described.

The container 4 of the first embodiment is a container with a length of 40 foot, which is used for transporting various kinds of general cargos; however, the type and size of container 4 is not limited to the 40-foot-length container. Alternatively, for example, a 20-foot-length container or another container, which is commonly and often used, may be applied as the container 4.

The container-type CAES power generation device 2 is configured so that the CAES power generation units are housed in the container 4; thereby, the transportation and on-site construction of the CAES power generation device can be facilitated. Further, the tanks 8, each required capacity of which may vary depending on the power-generating time, are arranged outside the container 4; therefore, design changes of the CAES power generation units depending on whether the required power-generating time is short or long are not necessary, and the same package (the compressors 5a to 5c, the power generators 9a to 9c, and the control device 12) is usable, which is cost effective. Furthermore, since the CAES power generation device 2 is of the container type, plural CAES power generation devices may be arranged for use. Additional CAES power generation devices may be constructed to easily obtain high capacity. In addition, the CAES power generation device 2 can be placed in an outdoor location. Moreover, a side open container may be used as the container 4 to allow easy maintenance.

In the first embodiment, both the compressors 5a to 5c and the power generators 9a to 9c are arranged in the container 4. Alternatively, only either the compressors 5a to 5c or the power generators 9a to 9c may be arranged in the container 4. The control device 12 may be arranged outside the container 4.

[Second Embodiment]

The container-type CAES power generation device 2 according to a second embodiment of the present invention is shown in FIG. 3A to FIG. 3C and FIG. 4. The container-type CAES power generation device 2 of the second embodiment is different from that of the first embodiment in that first heat exchangers 30a to 30c, second heat exchangers 32a to 32c, a first heat storage tank 33a, and a second heat storage tank 33b are provided, and other configurations of the container-type CAES power generation device 2 of the second embodiment are the same as those of the first embodiment in FIG. 1A to 1C and FIG. 2. Accordingly, portions of the second embodiment, which are the same as those in the configurations shown in FIG. 1A to 1C and FIG. 2 are assigned with the same reference numbers and the description thereof will be omitted.

With reference to FIG. 3A to 3C and FIG. 4, the container-type CAES power generation device 2 of the second embodiment is equipped with the first heat exchangers 30a to 30c and the second heat exchangers 32a to 32c inside the container and with the heat storage tanks 33a, 33b outside the container 4. The first heat exchangers 30a to 30c are connected via heat storage fluid supply pipes 34 (see FIG. 4) to the heat storage tanks 33a, 33b, and the second heat exchangers 32a to 32c are connected via heat storage fluid supply pipes 34 (see FIG. 4) to the heat storage tanks 33a, 33b. In the second embodiment, the first heat exchangers 30a to 30c (the compressors 5a to 5c), the second heat exchangers 32a to 32c (the power generators 9a to 9c), and the control device 12 are arranged substantially in a row in the container 4 in the mentioned order from the left in FIG. 3A and FIG. 3B.

A heat storage fluid flows through the heat storage fluid supply pipes 34. Pumps 36a to 36f for allowing the heat storage fluid to flow are arranged in the respective heat storage fluid supply pipes 34. The heat storage fluid circulates with pressure from the pumps 36a to 36f to flow from the first heat exchangers 30a to 30c through the heat storage tank 33a to the second heat exchangers 32a to 32c and flow therefrom through the heat storage tank 33b back to the first heat exchangers 30a to 30c.

The first heat exchangers 30a to 30c are, respectively, provided at the compressors 5a to 5c. Each first heat exchanger 30a to 30c is configured to transfer heat between the air flowing through corresponding one of the air supply pipes 14 located between the compressors 5a to 5c and the tanks 8 and the heat storage fluid flowing through corresponding one of the heat storage fluid supply pipes 34. Specifically, when the air is compressed by the compressors 5a to 5c and compression heat is therefore added to the air, heat is recovered from the compressed air and the heat storage fluid is heated by the recovered heat. The heated heat storage fluid is supplied through the heat storage fluid supply pipes 34 to the first heat storage tank 33a.

The first heat storage tank 33a is configured to store the heat storage fluid that has been heated to high temperature in the first heat exchangers 30a to 30c. The first heat storage tank 33a may be formed by a heat insulating material so that the heat of the heat storage fluid stored at high temperature in the first heat storage tank 33a is not released to the outside. The heat storage fluid stored at high temperature in the first heat storage tank 33a is supplied through the corresponding heat storage fluid supply pipes 34 to the second heat exchangers 32a to 32c.

The second heat exchangers 32a to 32c are, respectively, provided at the power generators 9a to 9c. Each second heat exchanger 32a to 32c is configured to transfer heat between the high-temperature heat storage fluid flowing through corresponding one of the heat storage fluid supply pipes 34 and the air flowing through corresponding one of the air supply pipes 14 located between the generators 9a to 9c and the tanks 8. Specifically, heat is recovered from the high-temperature heat storage fluid and the compressed air is therefore heated by the recovered heat. The compressed air that has been heated to high temperature is supplied through the corresponding air supply pipes 14 to the power generators 9a to 9c. The heat storage fluid that has been cooled by heat recovery in the second heat exchangers 32a to 32c is supplied through the heat storage fluid supply pipes 34 to the second heat storage tank 33b.

The second heat storage tank 33b is configured to store the heat storage fluid that has been cooled by heat recovery in the second heat exchangers 32a to 32c. The second heat storage tank 33b may be formed by a heat insulating material so that the heat of the heat storage fluid stored in the second heat storage tank 33b is not released to the outside. The heat storage fluid stored in the second heat storage tank 33b is supplied through the heat storage fluid supply pipes 34 to the first heat exchangers 30a to 30c.

As described above, the heat storage fluid is heated in the first heat exchangers 30a to 30c to be stored in the first heat storage tank 33a, thereafter being cooled by the second heat exchangers 32a to 32c to be stored in the second heat storage tank 33b. Then, the heat storage fluid is supplied back to the first heat exchangers 30a to 30c to be heated therein. Such process is repeated.

The arrangement of the heat storage fluid supply pipes 34 inside and outside the container 4 is the same as the arrangement of the air supply pipes 14. The first heat exchangers 30a to 30c inside the container 4 are connected via the heat storage fluid supply pipes 34 to the heat storage tanks 33a, 33b outside the container 4, and the second heat exchangers 32a to 32c inside the container 4 are connected via the heat storage fluid supply pipes 34 to the heat storage tanks 33a, 33b outside the container 4. For example, as indicated by a chain line 4A, if the heat storage fluid supply pipes 34 are merged inside the container 4 to be subsequently extended outward from the container 4, the number of pipes outside the container 4 can be reduced; however, an extra space in the container 4 is reduced. On the other hand, as indicated by a two-dot chain line 4B, if the heat storage fluid supply pipes 34 are extended outward from the container 4 to be subsequently merged outside the container 4, the number of pipes outside the container 4 is increased; however, an extra space in the container 4 can be easily secured. As a result, the arrangement of the heat storage fluid supply pipes 34 may be changed according to piping processing of the heat storage fluid supply pipes 34 or according to the necessity of an extra space in the container 4.

Figure 4:
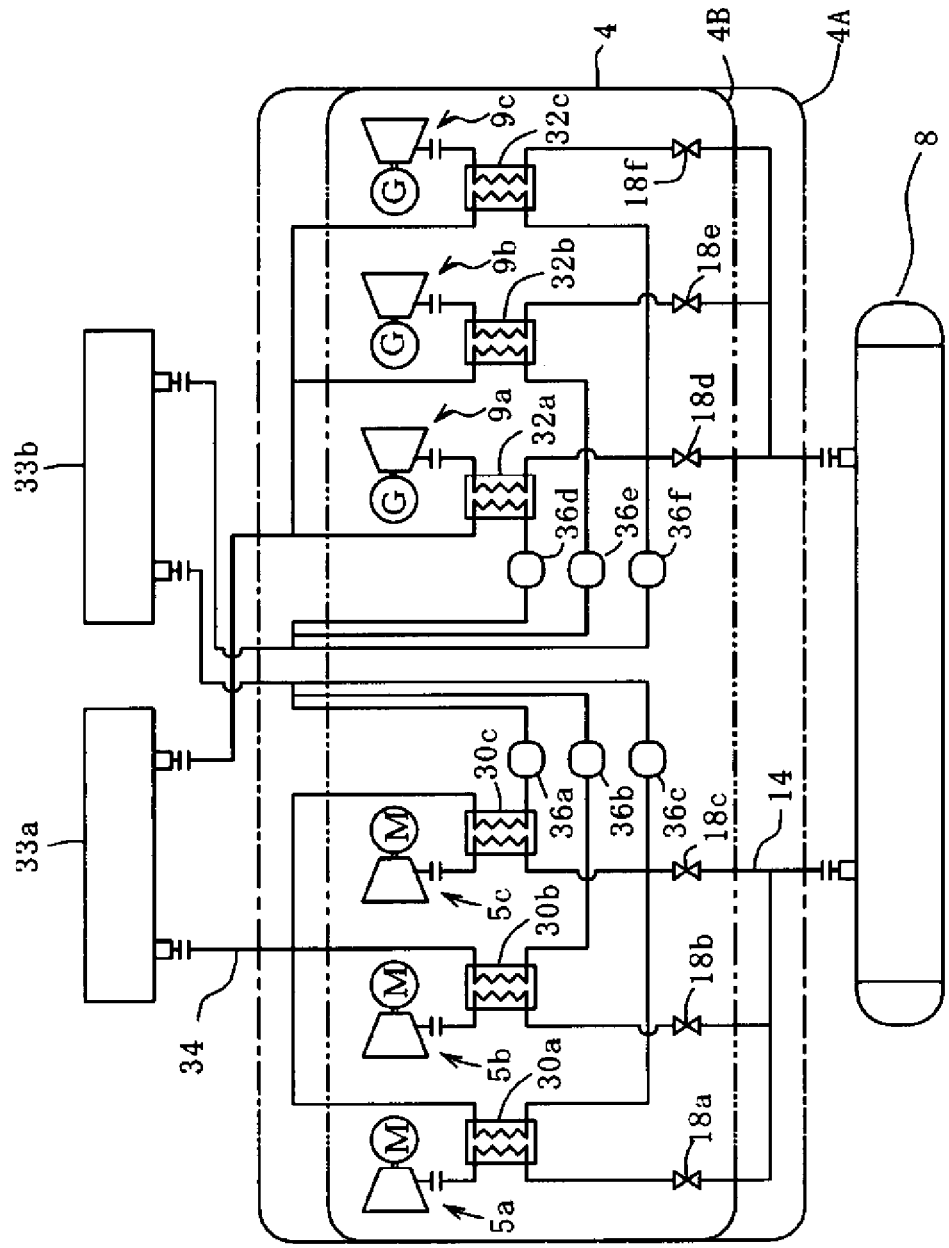
FIG. 4 is a schematic configuration diagram illustrating connection configurations of respective portions in FIG. 3A to FIG. 3C.
Figure 5:
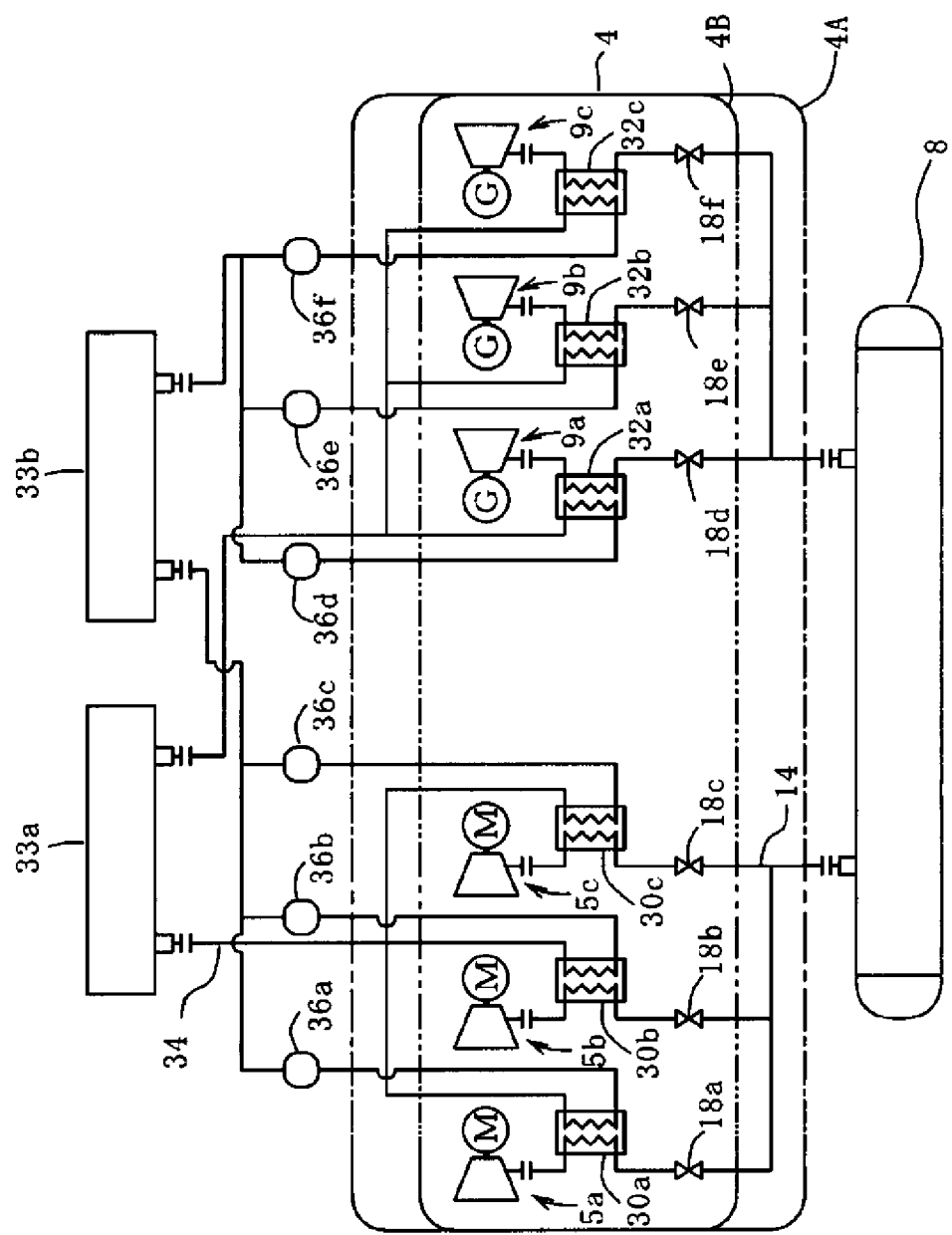
FIG. 5 is a schematic configuration diagram illustrating a case where a pump for driving a heat storage fluid is arranged outside a container.

In the second embodiment, as shown in FIG. 4, the pumps 36a to 36f are arranged in the container 4; thereby, the transportation and on-site construction of the CAES power generation device is facilitated. However, it may not be necessary for the pumps 36a to 36f to be arranged in the container 4. Alternatively, the pumps 36a to 36f may be arranged outside the container 4 as shown in FIG. 5; thereby, an extra space in the container 4 can be easily secured. Further, in the second embodiment, if a pump is provided in a location where the heat storage fluid supply pipes 34 are merged into one pipe line, the number of pumps can be reduced.

In the container-type CAES power generation device 2 of the second embodiment, the heat storage tanks 33a, 33b, each required capacity of which may vary depending on the power-generating time, are arranged outside the container 4; therefore, design changes of the CAES power generation units depending on whether the required power-generating time is short or long are not necessary. Consequently, the same package is usable, which is cost effective.

Figure 6A:
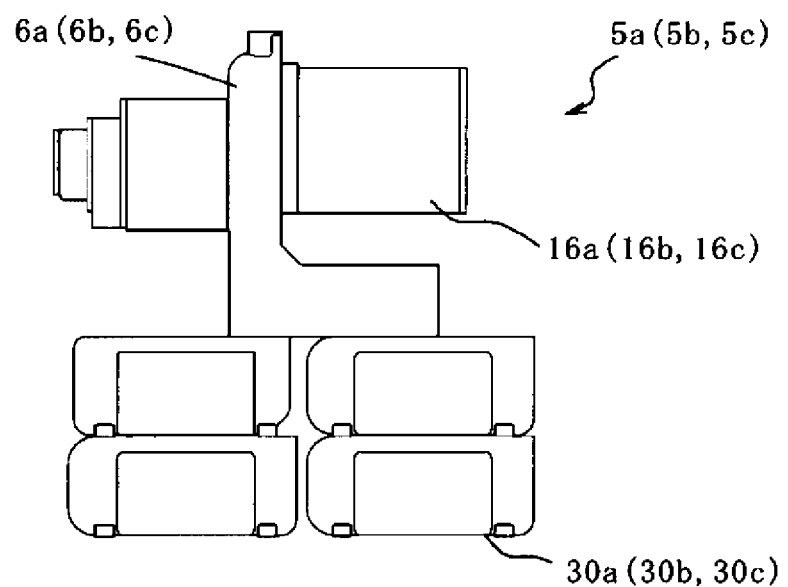
FIG. 6A is a side view of the layout of a compressor and a first heat exchanger.
Figure 6B:
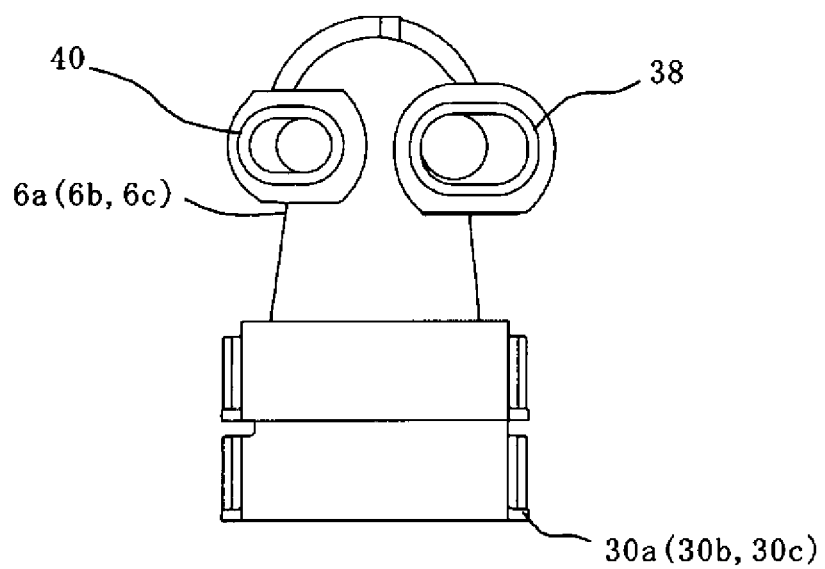
FIG. 6B is a front view of the layout of the compressor and the first heat exchanger.
Figure 7A:
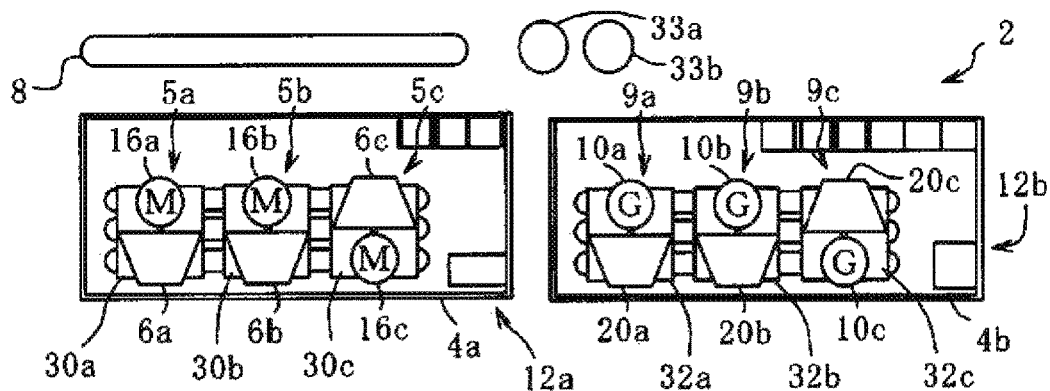
FIG. 7A is a plan view of the container-type CAES power generation device according to a third embodiment of the present invention.
Figure 7B:
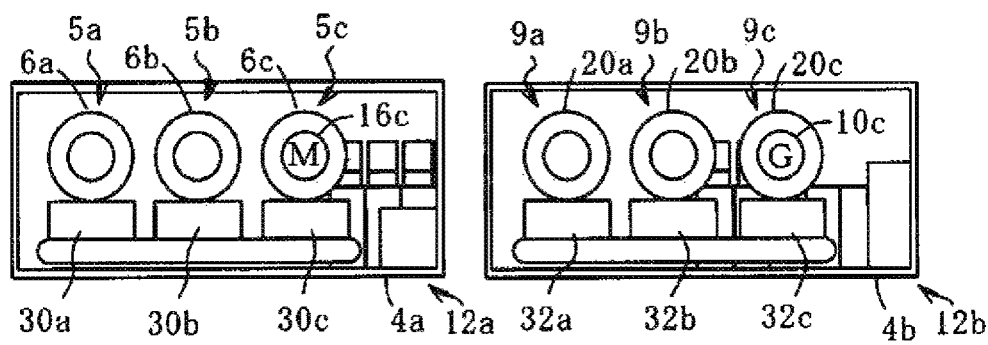
FIG. 7B is a front view of the container-type CAES power generation device according to the third embodiment of the present invention.
Figure 7C:
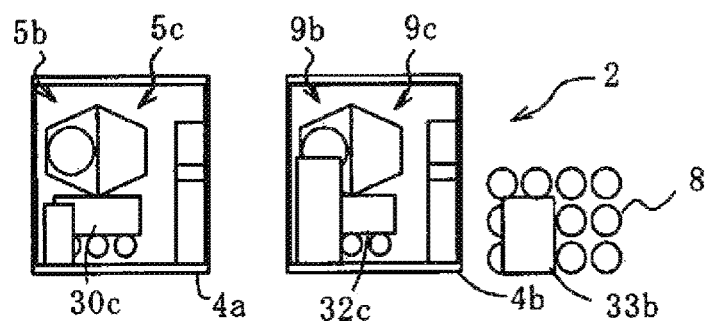
FIG. 7C is a side view of the container-type CAES power generation device according to the third embodiment of the present invention.

The layout of the first heat exchangers 30a to 30c will be described. FIG. 6A and FIG. 6B are front and side views, respectively, illustrating the layout of the first heat exchangers 30a to 30c and the compressors 5a to 5c. Each compressor 5a to 5c used in the second embodiment is a two-stage compressor including a low-pressure stage compression section 38 and a high-pressure stage compression section 40. Each first heat exchanger 30a to 30c functions as an intercooler for recovering heat from air compressed at the first stage by the low-pressure stage compression section 38 and cooling the compressed air and as an aftercooler for recovering compression heat from the air compressed at the second stage by the high-pressure stage compression section 40 and cooling the compressed air. Note that each compressor 5a to 5c may be the two-stage compressor, but not limited thereto. Alternatively, each compressor 5a to 5c may be a three-stage compressor or a single-stage compressor.

The layout of the second heat exchangers 32a to 32c is the same as the layout of the first heat exchangers 30a to 30c. In other words, in FIG. 6A and FIG. 6B, if the first heat exchangers 30a to 30c are replaced with the second heat exchangers 32a to 32c, and the compressors 5a to 5c are replaced with the power generators 9a to 9c, the second heat exchangers 32a to 32c and the power generators 9a to 9c are arranged in the same layout as that of the first heat exchangers 30a to 30c and the compressors 5a to 5c. Note that the second heat exchangers 32a to 32c are different from the first heat exchangers 30a to 30c in that each second heat exchanger functions as a heater relative to compressed air. In other words, the second heat exchanger functions as a preheater for heating air before the air is compressed at the first stage by the high-pressure stage compression section 40 and as an interheater for heating the air before the air is compressed at the second stage by the low-pressure stage compression section 38.

As shown in FIG. 6A and FIG. 6B, the first heat exchangers 30a to 30c (the second heat exchangers 32a to 32c) are arranged at the lower side of the compressors 5a to 5c (the power generators 9a to 9c) so as to overlap the compressors 5a to 5c (the power generators 9a to 9c). With the overlapping arrangement as just described, an installation area in the container 4 is not largely occupied and therefore a space can be effectively used. In addition, the compressors 5a to 5c are arranged adjacent to the first heat exchangers 30a to 30c so as to overlap the first heat exchangers 30a to 30c, or the power generators 9a to 9c are arranged adjacent to the second heat exchangers 32a to 32c so as to overlap the second heat exchangers 32a to 32c; therefore, the length of each of the air supply pipes 14 connecting these members can be reduced. Consequently, pressure loss or heat loss of the compressed air following through the air supply pipes 14 can be reduced.

In a case where the CAES power generation units are housed in the container 4, the compressors 5a to 5c (or the power generators 9a to 9c) or the like generate heat; therefore, the temperature inside the container 4 increases. As a result, electronics devices such as the control device 12 may be exposed to high temperatures. However, if an ACAES power generation facility is used to perform heat recovery, the temperature inside the container 4 can be inhibited from increasing. Therefore, the electronics devices such as the control device 12 can be protected from being damaged by heat. More specifically, if a total-heat-recovery type ACAES power generation facility provided by the applicant of the present application in Japanese patent application No. 2014-172836 and configured to fully recover heat to be generated is used, heat radiation inside the container 4 scarcely occurs; therefore, a ventilation fan or an air-conditioning apparatus is not required. Consequently, it may only have to provide a ventilation hole for allowing a free flow of air.

[Third Embodiment]

The container-type CAES power generation device 2 according to a third embodiment of the present invention is shown in FIG. 7A to FIG. 7C and FIG. 8. The container-type CAES power generation device 2 of the third embodiment is different from that of the second embodiment in the container 4 (a first container 4a and a second container 4b), and other configurations of the container-type CAES power generation device 2 of the third embodiment are the same as those of the second embodiment in FIG. 3A to 3C and FIG. 4. Accordingly, portions of the third embodiment, which are the same as those in the configurations shown in FIG. 3A to 3C and FIG. 4 are assigned with the same reference numbers and the description thereof will be omitted.

With reference to FIG. 7A to 7C and FIG. 8, the container-type CAES power generation device 2 of the third embodiment is equipped with the first container 4a and the second container 4b. The first container 4a and the second container 4b are containers with a length of 20 foot, which are used for transporting various kinds of general cargos; however, the size of the first container 4a and the second container 4b is not limited to the 20-foot-length container. Alternatively, for example, 40-foot-length containers or other containers, which are commonly and often used, may be applied as the first container 4a and the second container 4b.

Units related to the compression function are housed in the first container 4a. The units related to the compression function include the compressors 5a to 5c, the first heat exchangers 30a to 30c, and a control device 12a that is configured to control the compressors and the first heat exchangers.

Units related to the power generation function are housed in the second container 4b. The units related to the power generation function include the power generators 9a to 9c, the second heat exchangers 32a to 32c, and a control device 12b that is configured to control the power generators and the second heat exchangers.

Figure 8:
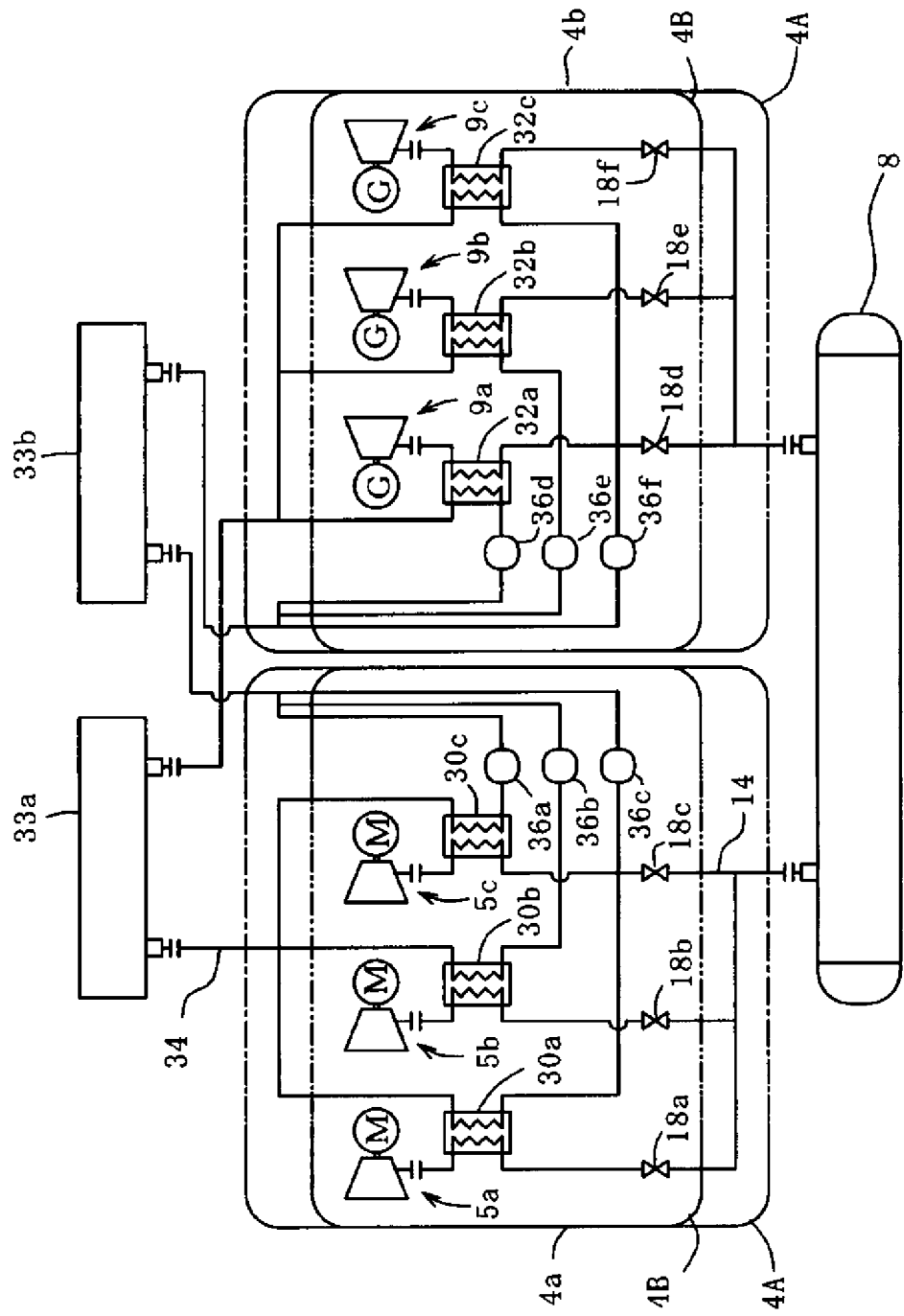
FIG. 8 is a schematic configuration diagram illustrating connection configurations of respective portions in FIG. 7A to FIG. 7C.

The arrangement of the air supply pipes 14 and the heat storage fluid supply pipes 34 inside the first container 4a and the second container 4b or outside the first container 4a and the second container 4b is the same as that in the second embodiment. In other words, the air supply pipes 14 may be merged inside the first container 4a and the second container 4b (see chain lines 4A in FIG. 8) or outside the first container 4a and the second container 4b (see two-dot chain lines 4B in FIG. 8). Likewise, the heat storage fluid supply pipes 34 may be merged inside or outside the first container 4a and the second container 4b. In FIG. 8, the pumps 36a to 36c are arranged inside the first container 4a, and the pumps 36d to 36f are arranged inside the second container 4b. Alternatively, the pumps 36a to 36c may be arranged outside the first container 4a, and the pumps 36d to 36f may be arranged outside the second container 4b in the same way as in the second embodiment (see FIG. 4 and FIG. 5).

The container-type CAES power generation device 2 of the third embodiment is provided with the first container 4a having the compression function and the second container 4b having the power generation function; thereby, each container 4a, 4b can be downsized. Such downsizing allows the container-type CAES power generation device to be more easily transported, and the design flexibility of the layout for arranging each container 4a, 4b can be expanded.

[Fourth Embodiment]

Figure 9:
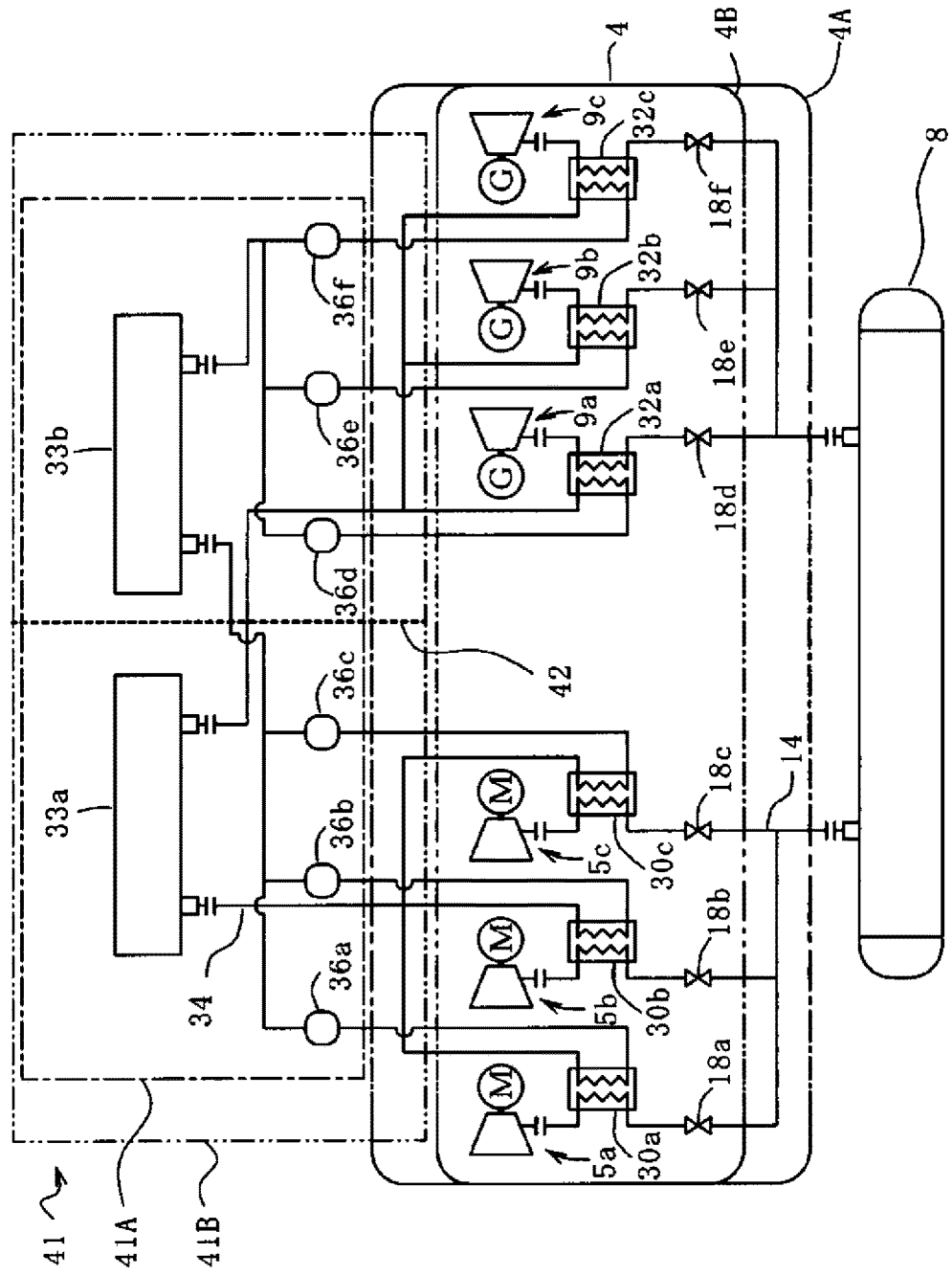
FIG. 9 is a schematic configuration diagram illustrating connection configurations of respective portions of the container-type CAES power generation device according to a fourth embodiment of the present invention.

The container-type CAES power generation device 2 according to a fourth embodiment of the present invention is shown in FIG. 9. The container-type CAES power generation device 2 of the fourth embodiment is different from that of the second embodiment in that a heat storage container 41 is provided, and other configurations of the container-type CAES power generation device 2 of the fourth embodiment are the same as those of the second embodiment in FIG. 5. Accordingly, portions of the fourth embodiment, which are the same as the configurations shown in FIG. 5 are assigned with the same reference numbers and the description thereof will be omitted.

With reference to FIG. 9, the container-type CAES power generation device 2 of the fourth embodiment is equipped with the heat storage container 41. The heat storage container 41 houses the first heat storage tank 33a and the second heat storage tank 33b. In the fourth embodiment, in the same way as the containers 4A, 4B of FIG. 5, the size and configuration of the heat storage container 41 may be changed in accordance with the arrangement of the heat storage fluid supply pipes 34. For example, as indicated by a two-dot chain line 41B, the heat storage fluid supply pipes 34 may be merged inside the heat storage container 41 to be subsequently extended outward from the heat storage container 41. On the other hand, as indicated by a chain line 41A, the heat storage fluid supply pipes 34 may be extended outward from the heat storage container 41 to be subsequently merged outside the heat storage container 41. As a result, the size and configuration of the heat storage container 41 may be changed according to piping processing of the heat storage fluid supply pipes 34 or according to the necessity of an extra space in the heat storage container 41.

The heat storage container 41 is an insulated container (also referred to as a thermal container) internally provided with a heat insulating material. The heat storage container 41 internally includes a partition 42 so as to separately house the first heat storage tank 33a and the second heat storage tank 33b. The temperature of the heat storage fluid to be stored in the first heat storage tank 33a is different from the temperature of the heat storage fluid to be stored in the second heat storage tank 33b. Accordingly, the partition 42 is provided in the heat storage container; thereby, the internal space can be separated and heat loss due to heat radiation can be prevented. The partition 42 is also formed of a heat insulating material, thereby further preventing heat loss.

In addition, in the fourth embodiment, the pumps 36a to 36f are arranged in the heat storage container 41; thereby, the transportation and on-site construction of the CAES power generation device is facilitated. However, the pumps 36a to 36f may not necessarily be arranged in the heat storage container 41. Alternatively, the pumps 36a to 36f may be arranged in the container 4 as in FIG. 4 or may be arranged outside the container 4 or the container 41. In order to enable an easier construction, the pumps 36a to 36f may be arranged in either the container 4 or the container 41.

[Fifth Embodiment]

Figure 10:
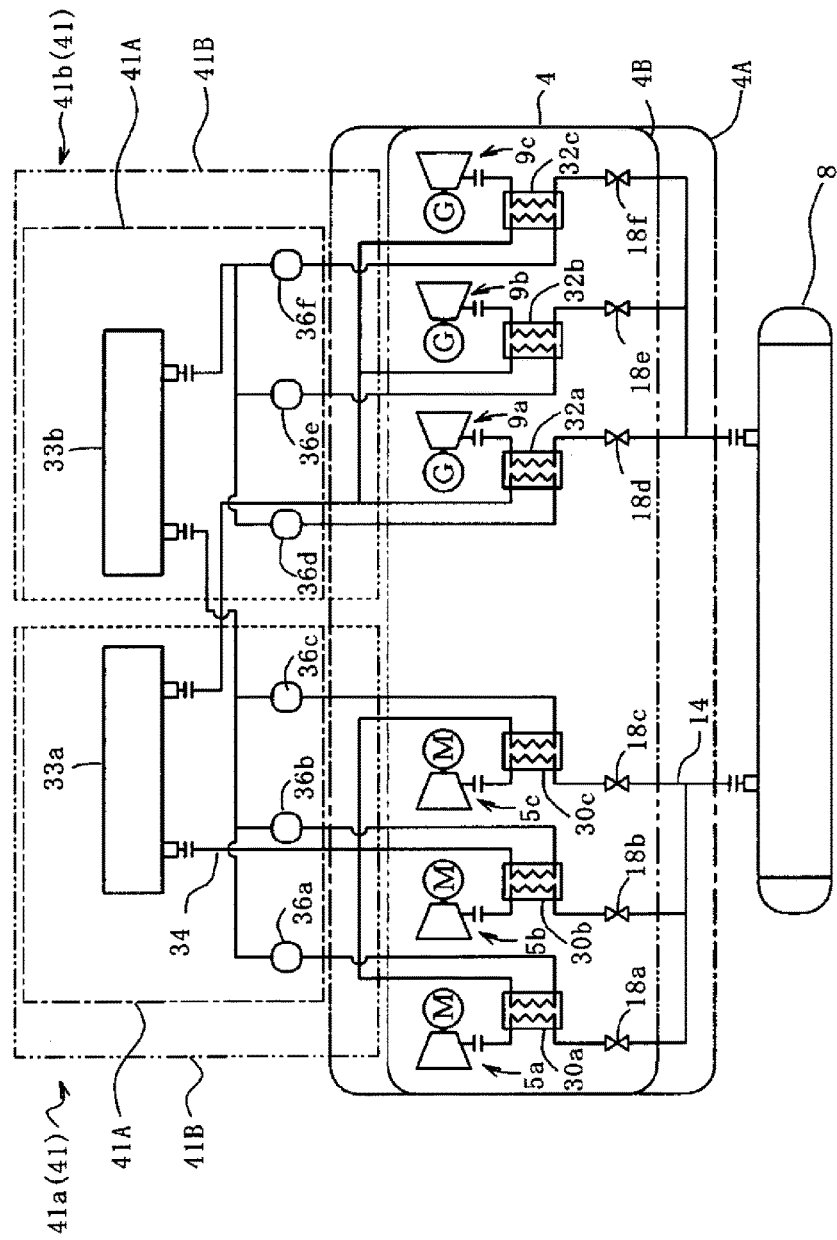
FIG. 10 is a schematic configuration diagram illustrating connection configurations of respective portions of the container-type CAES power generation device according to a fifth embodiment of the present invention.

The container-type CAES power generation device 2 according to a fifth embodiment of the present invention is shown in FIG. 10. The container-type CAES power generation device 2 of the fifth embodiment is different from the fourth embodiment in that the heat storage container 41 (a third container 41a and a fourth container 41b) is provided, and other configurations of the container-type CAES power generation device 2 of the fifth embodiment are the same as the configurations of the fourth embodiment in FIG. 9. Accordingly, portions of the fifth embodiment, which are the same as the configurations shown in FIG. 9 are assigned with the same reference numbers and the description thereof will be omitted.

With reference to FIG. 10, the container-type CAES power generation device 2 of the fifth embodiment is equipped with the heat storage container 41. The heat storage container 41 includes the third container 41a and the fourth container 41b. The third container 41a houses the first heat storage tank 33a. The fourth container 41b houses the second heat storage tank 33b. The arrangement of the heat storage fluid supply pipes 34 inside the third container 41a and the fourth container 41b or outside the third container 41a and the fourth container 41b is the same as that in the fourth embodiment. In other words, the heat storage fluid supply pipes 34 may be merged inside the third container 41a and the fourth container 41b (see two-dot chain lines 41B in FIG. 10) or outside the third container 41a and the fourth container 41b (see chain lines 41A in FIG. 10). The pumps 36a to 36f are arranged inside the heat storage container 41 in FIG. 10. Alternatively, the pumps 36a to 36f may be arranged outside the heat storage container 41 in the same way as in the second embodiment.

Each of the third container 41a and the fourth container 41b is an insulated container internally provided with a heat insulating material. The temperature of the heat storage fluid to be stored in the first heat storage tank 33a is different from the temperature of the heat storage fluid to be stored in the second heat storage tank 33b. Accordingly, a storage space is separated as the third container 41a and the fourth container 41b are provided; thereby, heat loss due to heat radiation can be prevented. In addition, there are provided the third container 41a for housing the first heat storage tank 33a and the fourth container 41b for housing the second heat storage tank 33b; thereby, each container 41a, 41b can be downsized. Such downsizing allows the container-type CAES power generation device to be more easily transported, and the design flexibility of the layout for arranging each container 41a, 41b can be expanded.

In each of the embodiments described here, the number of compressors 5a to 5c is equal to the number of power generators 9a to 9c. However, the number or the capacity of compressors 5a to 5c may not necessarily be equal to the number or the capacity of power generators 9a to 9c. The number or the capacity of the compressors 5a to 5c can be smaller than the number or the capacity of the power generators 9a to 9c and vice versa. Especially in the third embodiment, the first container 4a having the compression function and the second container 4b having the power generation function may be used in a state where the number of first containers 4a and the number of second containers 4b are altered.

Furthermore, the configuration in which the tanks 8 are arranged outside the container so as to be adjacent thereto is provided as an example in the embodiments; however, each tank is not limited to such configuration. Alternatively, the tank may be buried underground, or a tunnel or an underground space may be used as the tank.

| EXPLANATION OF REFERENCE NUMERALS | |
|---|---|
| 2 | Container-type compressed air energy storage power generation device (container-type CAES power generation device) |
| 4, 4A, 4B | Container |
| 4a | First container |
| 4b | Second container |
| 5a, 5b, 5c | Compressor |
| 6a, 6b, 6c | Compressor body |
| 8 | Tank |
| 9a, 9b, 9c | Power generator |
| 10a, 10b, 10c | Power generator body |
| 12, 12a, 12b | Control device |
| 14 | Air supply pipe |
| 16a, 16b, 16c | Motor |
| 18a, 18b, 18c, 18d, 18e, 18f | Valve |
| 20a, 20b, 20c | Expander |
| 22 | Control board |
| 24 | Inverter |
| 26 | Reactor |
| 28 | Converter |
| 30a, 30b, 30c | First heat exchanger |
| 32a, 32b, 32c | Second heat exchanger |
| 33a | First heat storage tank |
| 33b | Second heat storage tank |
| 34 | Heat storage fluid supply pipe |
| 36a, 36b, 36c, 36d, 36e, 36f | Pump |
| 38 | Low-pressure stage compression section |
| 40 | High-pressure stage compression section |
| 41 | Heat storage container |
| 41a | Third container |
| 41b | Fourth container |
| 42 | Partition |

The invention claimed is:

1. A container-type compressed air energy storage power generation device, comprising:
 a plurality of compressors for compressing air;
 a tank for storing the air compressed by the plurality of compressors;
 a plurality of power generators to be operated by the air supplied from the tank;
 a control device for controlling operation of the plurality of compressors and the plurality of power generators; and
 a container,
 wherein at least one of the plurality of compressors and the plurality of power generators is housed in the container,
 wherein the tank is arranged outside the container.

2. The container-type compressed air energy storage power generation device according to claim 1, wherein both the plurality of compressors and the plurality of power generators are housed in the container.

3. The container-type compressed air energy storage power generation device according to claim 2, wherein the container includes a first container housing the plurality of compressors and a second container housing the plurality of power generators.

4. A container-type compressed air energy storage power generation device comprising:
 a compressor for compressing air;
 a tank for storing the air compressed by the compressor;
 a power generator to be operated by the air supplied from the tank;
 a control device for controlling operation of the compressor and the power generator; and
 a container,
 wherein at least one of the compressor and the power generator is housed in the container,
 wherein the tank is arranged outside the container,
 wherein both the compressor and the power generator are housed in the container,
 wherein the container-type compressed air energy storage power generation device further comprises:
  a first heat exchanger for transferring heat between the air, compressed and heated in the compressor to be supplied into the tank, and a heat storage fluid and for heating the heat storage fluid;
  a second heat exchanger for transferring heat between the air, supplied from the tank to the power generator, and the heat storage fluid and for heating the air; and
  a heat storage section for storing the heat storage fluid, the heat storage section being fluidly connected to the first heat exchanger and the second heat exchanger,
 wherein the first heat exchanger is housed in the container housing the compressor, and the second heat exchanger is housed in the container housing the power generator, and
 wherein the heat storage section is arranged outside the container housing the compressor and outside the container housing the power generator.

5. The container-type compressed air energy storage power generation device according to claim 4, wherein the first heat exchanger is arranged at the lower side of the compressor so as to overlap the compressor, and the second heat exchanger is arranged at the lower side of the power generator so as to overlap the power generator.

6. The container-type compressed air energy storage power generation device according to claim 4, wherein the heat storage section includes:
 a first heat storage tank for storing the heat storage fluid heated to high temperature in the first heat exchanger, the first heat storage tank being fluidly connected to the second heat exchanger so that the heat storage fluid stored in the first heat storage tank is supplied to the second heat exchanger; and
 a second heat storage tank for storing the heat storage fluid cooled by heat recovery in the second heat exchanger, the second heat storage tank being fluidly connected to the first heat exchanger so that the heat storage fluid stored in the second heat storage tank is supplied to the first heat exchanger.

7. The container-type compressed air energy storage power generation device according to claim 6, further comprising a heat storage container housing the heat storage section, the heat storage container being internally provided with a partition to separately house the first heat storage tank and the second heat storage tank.

8. The container-type compressed air energy storage power generation device according to claim 6, further comprising a heat storage container housing the heat storage section, the heat storage container including a third container storing the first heat storage tank and a fourth container storing the second heat storage tank.

9. The container-type compressed air energy storage power generation device according to claim 4, further comprising a heat storage container housing the heat storage section.

10. The container-type compressed air energy storage power generation device according to claim 9, wherein the heat storage container housing the heat storage section is an insulated container internally provided with a heat insulating material.

\* \* \* \* \*